(12) United States Patent
Patzer (10) Patent No.: US 10,552,875 B1
(45) Date of Patent: Feb. 4, 2020

(54) GRAPHICAL USER INTERFACE FOR MANAGING A CAMPAIGN

(71) Applicant: INTUIT INC., Mountain View, CA (US)

(72) Inventor: Aaron Patzer, Providence, RI (US)

(73) Assignee: INTUIT INC., Mountain View, CA (US)

( * ) Notice: Subject to any disclaimer, the term of this patent is extended or adjusted under 35 U.S.C. 154(b) by 127 days.

(21) Appl. No.: 15/939,639

(22) Filed: Mar. 29, 2018

Related U.S. Application Data (63) Continuation of application No. 11/881,523, filed on Jul. 26, 2007, now abandoned.

(51) Int. Cl.
*G06Q 30/02* (2012.01)

(52) U.S. Cl.
CPC ..... *G06Q 30/0269* (2013.01); *G06Q 30/0201* (2013.01); *G06Q 30/0206* (2013.01)

(58) Field of Classification Search
CPC .................................................. G06Q 30/02
See application file for complete search history.

(56) References Cited

U.S. PATENT DOCUMENTS

| | | |
|---|---|---|
| 2002/0052782 A1* | 5/2002 | Landesmann .......... G06Q 20/20 705/14.2 |
| 2003/0046222 A1 | 3/2003 | Bard et al. |
| 2003/0229585 A1 | 12/2003 | Butler |
| 2004/0107131 A1* | 6/2004 | Wilkerson ............. G06Q 10/10 705/7.29 |
| 2004/0210513 A1 | 10/2004 | Harford et al. |
| 2005/0203800 A1 | 9/2005 | Sweeney et al. |
| 2006/0155597 A1* | 7/2006 | Gleason ................ G06Q 30/02 705/14.12 |
| 2006/0277130 A1 | 12/2006 | Harmon |
| 2008/0059352 A1 | 3/2008 | Chandran |
| 2008/0065569 A1 | 3/2008 | Dutt et al. |

* cited by examiner

*Primary Examiner* — Marilyn G Macasiano
(74) *Attorney, Agent, or Firm* — Patterson + Sheridan, LLP (57) ABSTRACT

A system and method allows an offeror to identify parameters for determining whether a user could benefit from an offer, and transaction data for each of several users, and the parameters, are used to determine which of several users could benefit from the offer. The offer is presented to those users, along with the data of how the user could benefit, and the system and method allows the user to accept the offer, transmitting information to the offeror or his agent if the user accepts the offer. Payment may be made based on the offers, acceptances, or both.

20 Claims, 4 Drawing Sheets

GRAPHICAL USER INTERFACE FOR MANAGING A CAMPAIGN

CROSS-REFERENCE TO RELATED APPLICATIONS

This application is a continuation of co-pending U.S. patent application Ser. No. 11/881,523, entitled "System And Method For Offering Products And Services To Users" filed on Jul. 26, 2007, which is incorporated herein by reference in its entirety.

FIELD OF THE INVENTION

The present invention is related to computer software and more specifically to advertising computer software.

BACKGROUND OF THE INVENTION

Advertising products or services that might be cheaper for a user can frequently suffer from a drawback: the user doesn't know whether a replacement or new product or service will truly be cheaper for that user until the user undertakes an investigation as to whether this is true. The investigation can require assembling records concerning the cost of the user's current products or services, if any, and then obtaining the price for that user for the potential replacement products or services. This process can be seen as too cumbersome by users, who fail to investigate new or replacement products or services that would truly represent a savings or an improvement.

Thus, potential users of such products and/or services pay little attention to many advertisements for products or services that could benefit them, because the investigation is too cumbersome, and after the investigation, many of such advertisements would provide no benefit to that user.

What is needed is a system and method that can determine whether a product or service is appropriate for a user, without requiring the user to perform a lengthy investigation, and can advertise such products or services to the users for which the product or service is deemed appropriate, without requiring all users to view such an advertisement.

SUMMARY OF INVENTION

A system and method collects data from actual transactions for each of many users from one or more different sources and associates the transaction data to the user with which it corresponds. Each of several potential advertisers provides a target user criteria that describes the type of users to which any advertisements should be displayed, as well as a formula for identifying the amount of money a target user may be spending on products or services for which the advertiser's products or services would apply. Also received from each of the potential advertisers is the price of that advertiser's products and/or services, which may also be specified by way of a formula, and/or other information that can be used to identify what the actual price for the advertiser's product or service for a user will be. The spending formula and price may include information on how to compare what the user is purchasing with what the advertiser is offering, and a specification of various bases that can be used to compare the two.

The system and method then selects potential target users using the target user criteria received. For each user meeting the target criteria, the spending formula is applied to determine the amount the target user is currently spending, an offer price is computed, and the two are compared. If the offer price is less than the result of the spending formula, using any basis specified, the user is marked as one that could benefit from the offer. The number of such users is counted and the number of users is displayed to the potential advertiser by geographic region, such as state, metropolitan area, or both, based on the home location of the user. The system and method computes and displays the price of an offer that can be made to those users, for example based on the number of users that can benefit. The system and method allows the advertiser to change the offer price, spending formula, or target user criteria, and re-determine the number of users who could benefit from the offer and the price the advertiser would pay for such an offer. This may be done any number of times until the advertiser has an offer that will produce a desired number of users who could benefit from the offer and a price within the advertiser's budget.

The advertiser then authorizes the offer and supplies a message that will be provided to the recipients of the offer. Any additional categorized and uncategorized transaction data from one or more sources may be received, and users who could benefit from the offer are identified using the transaction data and the target user criteria and marked, and if the additional data causes users who had been marked as being able to benefit from the data to no longer qualify as being able to benefit, such users are unmarked. The process of identification and marking or unmarking can occur repeatedly in real time, or in batches, such as nightly.

When a user logs in, the system and method checks to see what offers have been identified as ones that can benefit that user, and the user is shown the advertiser supplied message for such offers, as well as the related transaction information, and pricing calculations that allow the user to view that the calculations were correct, to see that the advertised product or service is less expensive or a better value for the user, and to accept or decline the offer. If the user accepts the offer, sufficient information to sign the user up to receive the product or service being offered is provided to the advertiser or to another party designated by the advertiser. Any information that is required to sign up the user for the offer, but not already stored by the system and method, may be requested from the user provided as described above and stored. If the user declines the offer, the offer is marked to prevent it from being shown to the user again. The user may indicate that the user is too busy to review the offer and he or she wishes the system and method to present it to the user again the next time the user logs in and the system will do so. Any number of advertisers can utilize the system and method, each one providing any number of offers to any number of users. The advertiser can see how many users will benefit from the offer and how much the campaign will cost before the offer is provided to the users.

The system and method allows an offer that will benefit user A, but not users B or C, to be presented to user A and not to users B and C. An offer that will benefit users A and C, but not user B, is presented to users A and C and not presented to user B. The users are thus more likely to pay attention to offers presented, because they will not have seen prior offers from the same source that do not benefit them.

DETAILED DESCRIPTION OF A PREFERRED EMBODIMENT

Figure 1:
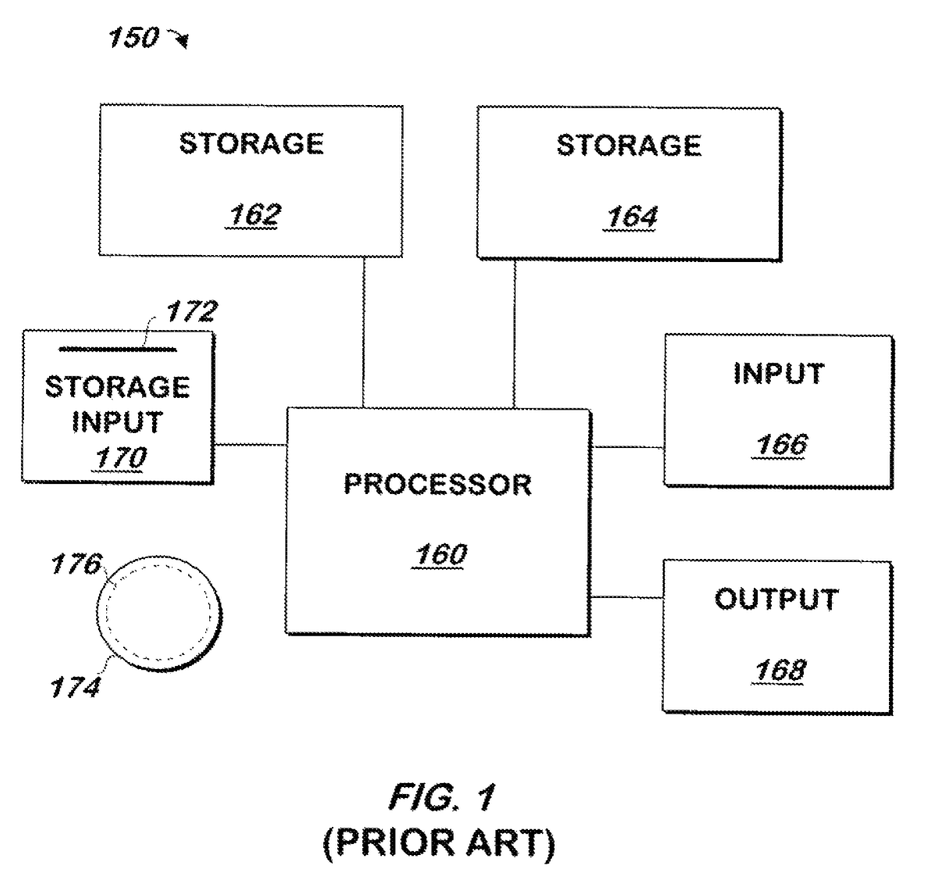
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE, INC. of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2A:
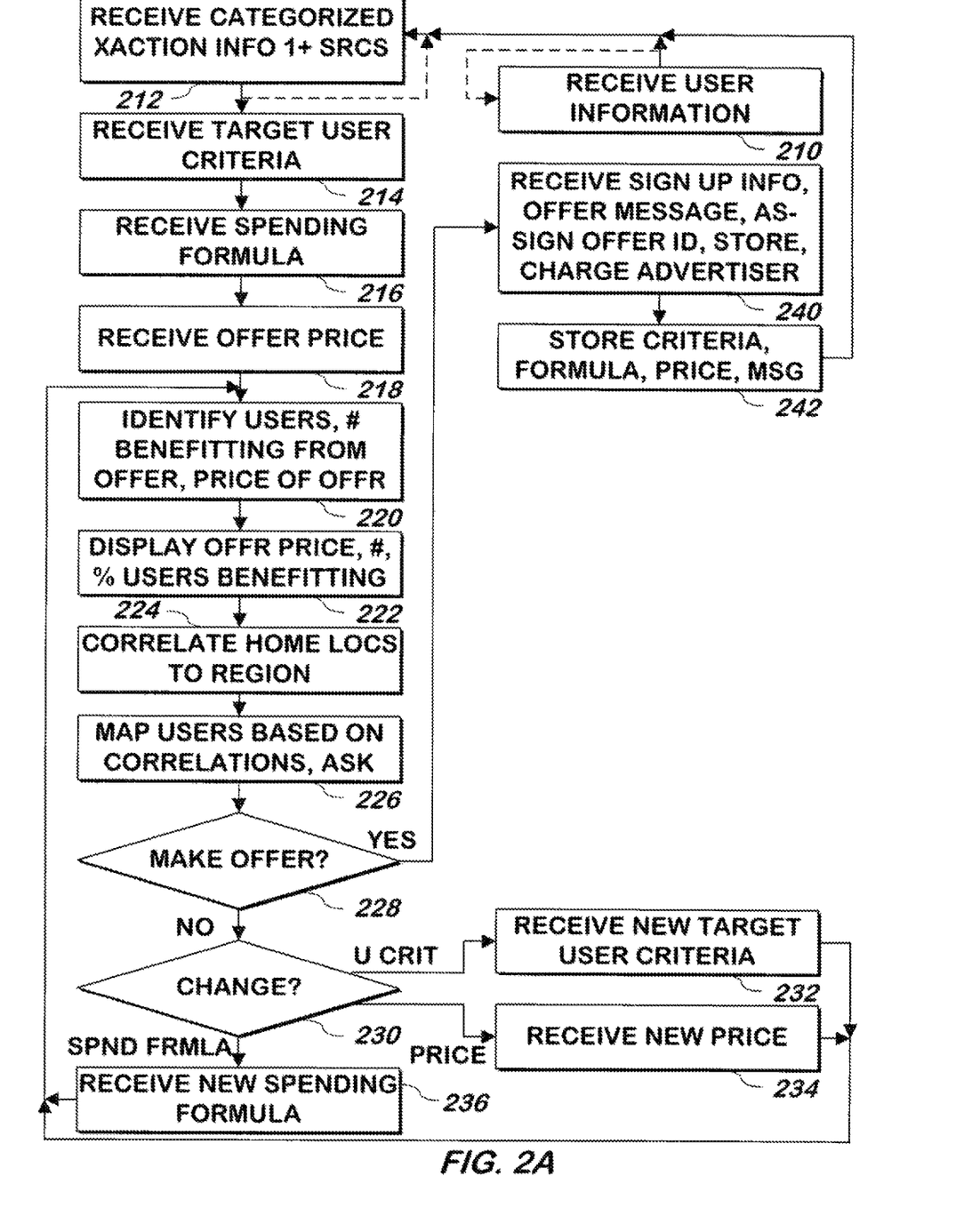
FIG. 2A is a flowchart illustrating a method of identifying users who can benefit from an offer according to one embodiment of the present invention.

Referring now to FIG. 2A, a method of identifying users who can benefit from offers is shown according to one embodiment of the present invention.

Registration information is received from each of several users 210. Registration information may include the user's name and address, and optionally, information about accounts the user has at financial institutions. Accounts may be credit card, debit card or other accounts that can be used to make purchases from vendors of goods and services. The user may provide home location information, describing one or more places they consider to be residences or primary places in which they spend significant amounts of time, for example a work location or a significant vacation location. User information may also include demographic or geographic information or other information about the user, his or her family and/or his or her assets. In one embodiment, such information may be received from a user or purchased from services that supply such information. Such information may be received explicitly, or it may be identified using as part of step 212 using the transaction information received. For example, if there are a threshold number of transactions at children's stores received in any prior period, the attribute that the user has children is implied. The user's attributes and home location(s) are stored associated with a unique user identifier as part of step 210. Information from any number of users, such as two or more users, may be received and stored, as indicated by the dashed line in the Figure.

For each of several users, preprocessed transaction information is received from one or more sources 212. The preprocessed transaction data may be received electronically, for example via the Internet. In one embodiment, the transaction information received in step 212 includes transaction records from credit card transactions, debit and check transactions, cash transactions, and other types of financially-related transactions. The transaction information includes any or all of an amount of the transaction, an account number, an identifier of a type and financial institution (e.g. Discover, Bank of America Debit, and the like, or a financial institution routing number or other similar identifier), a merchant name, a date, a transaction number, and a category. The preprocessing may be used as described in the related application to assign a category, merchant name or both to each transaction. In one embodiment, transaction information from any number of users may be received periodically, such as nightly, or in real time, and therefore step 212 occurs as an independently running process as indicated by the dashed line in the Figure. Some or all of the transaction information received in step 212 may be categorized and have a vendor name associated with it as described in the related application, though other means of categorizing transactions may be employed. The transaction information for each user is stored associated with that user's user identifier. This may be accomplished by matching the account identifier received in step 212 to the account information received for the users in step 210 to associate the transaction information with each user. A translation may be performed before the information is matched, for example to match the Bank of America bank routing number that may be provided with debit card transaction information from that bank to a user specified account that is simply noted as the Bank of America, for example, using a system administrator-supplied table that matches names of institutions (e.g. "Bank of America") with the appropriate bank routing number or numbers.

The transaction information need not be associated with an account identifier. For example, users may manually enter their own transaction data and such transaction data may be associated with an identifier of the user at that time, skipping the need for a matching step to match the transaction data to a particular user. Other ways of providing transaction data may include the user specifying a location of a file containing the transaction data, and the transaction data may be associated with an identifier of the user at that time. A third party supplier of transaction data may be able to supply an identifier of the user to which the transaction data corresponds, and so the user need not provide the transaction data, yet the transaction data may be associated with that user.

From an advertiser or other offeror, a target user criteria is optionally received 214. Although one advertiser or offeror is described, the same process may be used for each of several different advertisers. Target user criteria describe the users to which an offer could apply, and could include all users. In one embodiment, target user criteria may include home locations, user attributes, activity in a category or category descending from a specified category (e.g. one or more transactions in the "autos" category, or more than $30 in the "phone" category in the last 45 days), transaction attributes (e.g. at least two transactions in the "auto rental" category that exceed $100 in the last two years), or lack of activity in a category or lack of a certain transaction or sufficient transactions (e.g. one) in one or more categories. User attributes are any of those described above. The merchant name corresponding to the transaction can also be used in the target user criteria, for example, by specifying only users who purchase from certain merchants or who don't purchase from certain merchants as part of or all of the target user criteria. The merchant name may be specified using various ways that merchant identifies itself in transactions, and may include wildcards. The specification of a merchant may include one or more categories, so that merchants with similar names in other categories are not confused with the specified merchant.

A spending formula is also received from the advertiser 216. In one embodiment, this spending formula describes transactions or categories in which the user has purchased products or services that can be used to determine whether the advertiser's product or service could benefit that user. For example, a spending formula may average all transactions recurring for more than three months from the "phone" category where the merchant name is "Verizon", "Cingular" or "Sprint". Spending formulas of any arbitrary complexity may be specified, using any conventional formula specification.

An offer price is received from the advertiser 218. In one embodiment the offer price includes a formula for calculating all charges that might occur during a given period (e.g. one year) if the user purchases the advertiser's product or service. In one embodiment, the offer price includes any or all of a setup fee, any initial charges, and any later charges, plus taxes and other charges. The initial charges might include a low introductory monthly or quarterly fee, with the later charges including the monthly or quarterly fee that would be charged to the user after the initial charges had been charged to the user, if the user purchases the advertiser's product or service.

In one embodiment, some or all of the offer price to be made to a user can be specified as a function of the categorized transaction data of that user. This allows the advertiser to estimate a price based on the current usage of another service. Thus, the price for a cell phone user having a minimum usage plan of a competitor could be specified as a minimum usage plan of the advertiser, but a different user with a higher priced plan of a competitor could be specified a different price that corresponds to that higher priced plan. The plan can be determined by the amount of the transaction or transactions.

In one embodiment, the spending formula and offer price may each contain a formula for identifying a common value component by which a comparison can be made. The value formula of the spending formula may be based in part on any or all of the vendor name or names corresponding to the transaction, the charges from each of those vendors, and information supplied by the advertiser regarding those vendors and those charges. For example, a user that has two cell phone plans from Sprint and Verizon in the cell phone calling plan category may be identified from these transactions by comparing the charges that appear from each of these two vendors and a table of charges, as having a calling plan from Sprint that provides 500 minutes, and a calling plan from Verizon that provides 800 minutes. The value component of these plans would be the cost per minute of calling averaged over these two plans, with the known charges devoted to the calling plans separated from the other charges, such as those for text messaging, that may be part of the total charge in the transaction data. The average cost per minute of use that the user is paying for both plans can thus be identified or estimated. If the advertiser is Cingular Wireless, and wishes to promote a family plan, the pricing formula would identify not only the family plan of Cingular that most closely corresponds to the services the user is already receiving from the other two vendors, but may also specify the cost per minute of each such family plan as its value component.

In one embodiment, the price received from the advertiser specifies one or more bases of comparison to be used in determining whether the user would benefit from an offer. The value component may be specified in the pricing formula as one basis of the comparison, described below, for the offer. The total price can be another basis. Thus, in the example above, a user could be determined to benefit from an offer if the total price over a period of time specified was lower than the spending formula, or if the value component of the price was lower than the value component of the spending formula.

In one embodiment, specifications by the advertisers of any of the information described herein may be by way of objects, in which predefined attributes are used along with specified attribute values for the offer. This allows specifications to be tailored to one of several types of offers. Calculations described herein may then be tailored to the type of offer or the type among those for which objects exist that is nearest to the offer. This can serve to simplify the specification process for the advertiser, who could use the object as a base, and either leave certain attributes blank or add in other attributes as part of a formula. For example, a gym membership object would have predefined attributes for an initiation fee, plus a monthly dues fee, and specified competitors. The target user criteria would then be automatically generated from the object as those users who have monthly transactions from the specified competitors, the spending formula would be the recurring fees from those competitors and the offer price would be the initiation fee plus the monthly fee, and the time period would be predefined at 12 months.

It is noted that for fees that recur in the transaction data for a user, such fees may be extrapolated over a longer time period than they actually recurred. The average of fees in a category or from a competitor over a period in which they did recur or recurred within a tolerance amount or percentage can be extrapolated over the period.

The users and number of users that would benefit from the offer are identified, as well as the average price of the offer that applies to each user 220. Users that would benefit from the offer are those that match the target user criteria, and for which the outcome of the spending formula received in step 216, as applied to that user's transaction data received in step 212, is higher than the offer price received at step 218, or higher by a threshold amount which may be received as part of the offer price. As noted, various bases may be specified, with a priority specified for each basis, and the number of users for which the spending formula basis was higher than the corresponding cost basis for a given priority, but not for any higher priorities, may be separately identified, along with an identifier of the corresponding basis specified in the spending formula, price, or both.

In one embodiment, the spending formula and the offer price are calculated over a period of several months, such as 12 months, although in one embodiment the spending formula and offer price may be calculated over a single month. In one embodiment, the number of months by which charges should be calculated to determine whether a user would benefit is also received in the spending formula as part of step 216.

In one embodiment, the number of users that would benefit from the offer are displayed 222, such as by displaying the number of users in each of several regions according to the home location of each user that would benefit. In one embodiment, other information such as the percentage of users that would benefit are also displayed. The percentage may be the number who would benefit divided by the number of users meeting the target criteria, or divided by the number of users or both percentages may be displayed and any or all of these numbers may also be displayed. Regions may include cities, area codes, states, counties, countries, or other geographic regions.

In one embodiment, the numbers or percentages may be further broken down by the numbers and percentages for each of three existing vendors being used by the users, to allow the advertiser to determine the quantity from which competitors business would be taken if all of the users who can benefit from the offer accept the offer. Such information would also allow the advertiser or other offeror to determine whether making the offer would cannibalize too much existing business, though existing customers of the offeror could be excluded using the target user criteria. The competitors may be specified as part of the spending formula, or all merchant names associated with the transaction data may be used.

In one embodiment, step 222 includes displaying a fee that would be charged to the advertiser if the advertiser elects to make the offer. The offer fee may include any or all of an up front price for making the offer, and a price charged for each offer that a user accepts. The offer fee may be computed based on the number of users, average spread between the offer price for a user and the outcome of the spending formula for that user, the basis of the comparison with the highest priority that applies to that user, and/or other information, such as receiving bonuses for users who switch from certain listed competitors.

In one embodiment, the home locations of each user are correlated to regions 224, such as major metropolitan regions and/or states or countries, and the display of information may also or instead be provided 226 on a map, such as a map of one or more states or a map of the United States, or a map of a different country, continent or some or all of the world. Additional information, such as the average price that would be paid by region, may also be displayed on the map.

The advertiser is then asked as part of step 226 whether the offer should be made, and if the advertiser elects to make that offer 228 the method continues at step 240, otherwise the method continues at step 230.

At step 230, if the advertiser does not wish to make an offer, the advertiser can change the spending formula, target user criteria or price. If the advertiser elects to change the target user criteria 230, new target user criteria is received 232 and the method continues at step 220, using the new target user criteria. If the advertiser elects to change the price 230, a new offer price is received 234, and the method continues at step 220 using that new offer price. If the advertiser elects to change the spending formula 230, a new spending formula is received 236, and the method continues at step 220 using the new spending formula.

The advertiser can thus change the parameters of the offer and review the price the advertiser will be charged, and the number of users who could benefit from the offer or the other numbers or percentages, until the advertiser is satisfied with those results of the offer, and indicates that the offer should be made 228 to users who could benefit from that offer.

At step 240, an offer message may be received from the advertiser. The offer message may be received in XML or HTML or other format that describes how to present the offer to the user. The offer message may consist of several parts, with each part designated as corresponding to a basis. The message for the highest priority basis is the message that will be displayed for a given user. Different messages may be specified based on any of the parameters specified. Thus, a user who uses a certain competitor as indicated by the transaction data for that user may receive a different message.

The most recently received target user criteria, spending formula, and price, as well as the message information, are stored associated with the advertiser. A specification of sign up information regarding the fields that should be transmitted to the advertiser or to a third party to sign the user up for the offer, if the user assents to the offer, is also received as part of step 240. In one embodiment, the sign up information specification includes information regarding how and where to transmit the sign up information for users who sign up, as well as other information regarding the sign up process. Step 240 also includes assigning an offer identifier to the offer. In one embodiment, step 240 includes charging the advertiser or another party the offer fee for making the offers, or obtaining a commitment to pay a charge to be made at a later time. The information for the offer (target user criteria, price, spending formula, message, sign up information, etc.) is stored associated with the offer identifier 242.

Figure 2B:
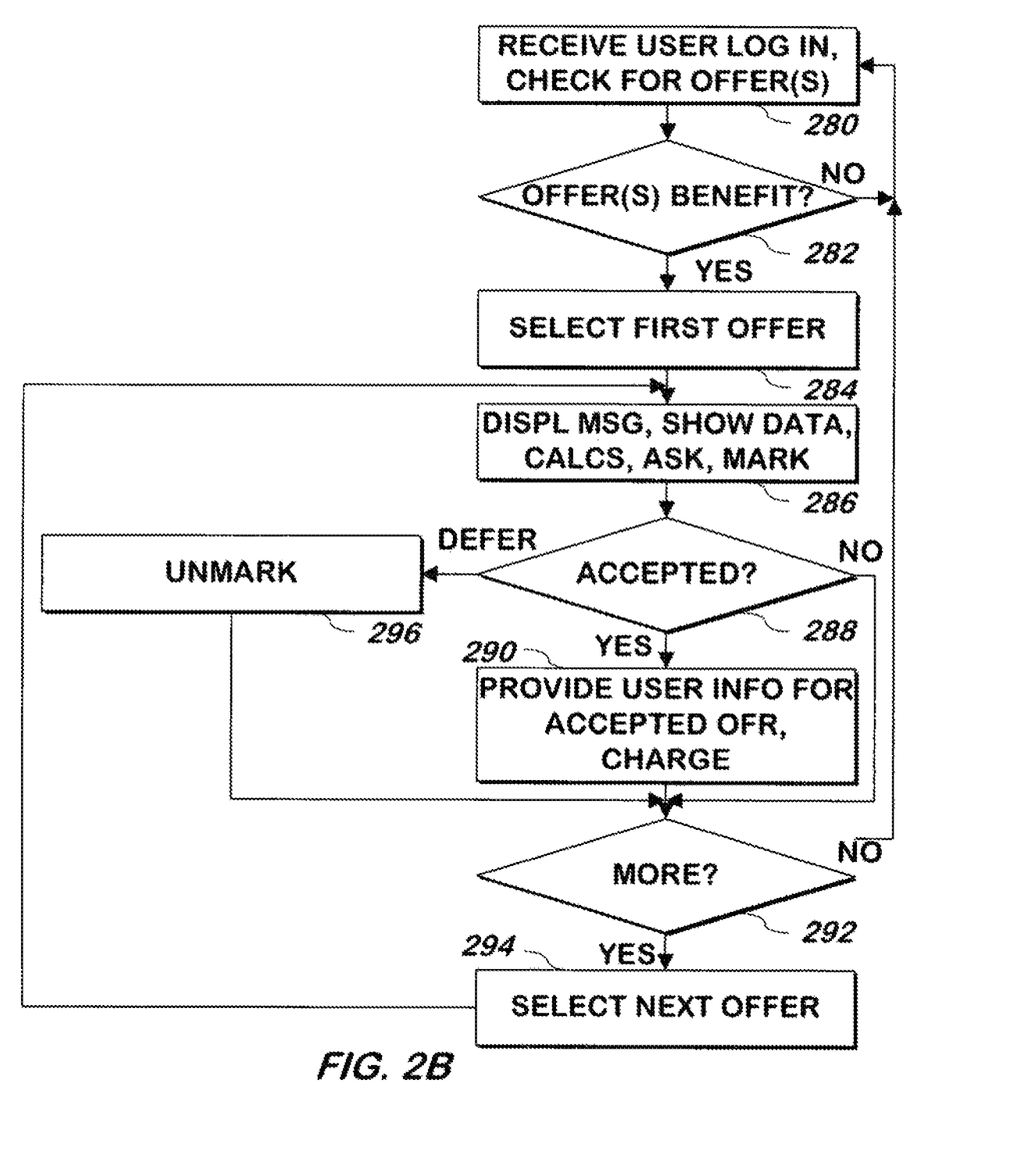
FIG. 2B is a flowchart illustrating a method of providing offers to users who can benefit from such offer according to one embodiment of the present invention.

Referring now to FIG. 2B, a method of presenting offers to users is shown according to one embodiment of the present invention. When a user logs in, that user's attributes, home location(s), and transaction information are compared to stored offers not already presented to the user to determine if the user would benefit from any of those offers, as described above 280. (In another embodiment, the determination of whether an offer would benefit a user is performed for all users when the offer is received. When the user logs in, a determination of whether any offers that would benefit the user and have not already been presented to that user exists.) An offer would benefit a user if the spending formula as applied to the transactions for that user are less than the price value or other basis of comparison specified, for any user that meets the target user criteria. If any of the offers would benefit that user 282, the first such offer is selected 284, and the message for the selected offer is displayed 286, including displaying the data such as transaction information that was used to calculate the outcome of the spending formula as well as the calculations used for the price. As noted, the various bases specified may be used to determine whether the offer would benefit the user, and the message corresponding to the basis that benefits the user that has the highest priority is the message that is displayed. The difference between the spending formula and the price may be presented to the user as the amount of potential savings. As part of step 286, the user may be asked if he or she would like to accept that offer and the user's response is received.

If the user does not accept the offer 288, the method continues at step 292. Otherwise, if the user accepts the offer 288, the offer information specified for the offer is provided to allow the user to purchase the offered product or service 290, such information being provided from a database of information about the user, supplied by the user in response to prompts for such information if such information is not stored in the database, or both, and the method continues at step 292. Step 290 may include charging the advertiser or other party associated with the offer for the acceptance of the offer. Such charge may be based on the spread between the price for that user and the spending formula for the user, whether the user had been using the products or services of a competitor specified as described above, specified characteristics of the user, the highest-priority basis by which the user benefits from the offer, or may be based on other issues.

At step 292, if more offers would benefit the user, the next such offer is selected 294 and the method continues at step 286 using the newly selected offer, and otherwise 292, the method continues at step 280 for a different user. In one embodiment, step 284 includes marking the user as having seen the offer. Only offers that are determined to be ones for which the user could benefit but not ones that the user has already seen are displayed as part of steps 284. Thus, steps 282 and 292 only determine if there are offers for which the user can benefit but has not yet seen. The user may, at step 288, indicate that the user is undecided, and if so, the offer is unmarked 296 so that it will be displayed at a later time, and the method continues at step 292.

As used herein, a "user" is any person or entity that can benefit from an offer. The user need not sign in, as other ways of identifying a user may be used. For example, if the user's e-mail address is known, the offer may be emailed to that user, or the offer may be mailed to that user's home or business address.

System

Figure 3:
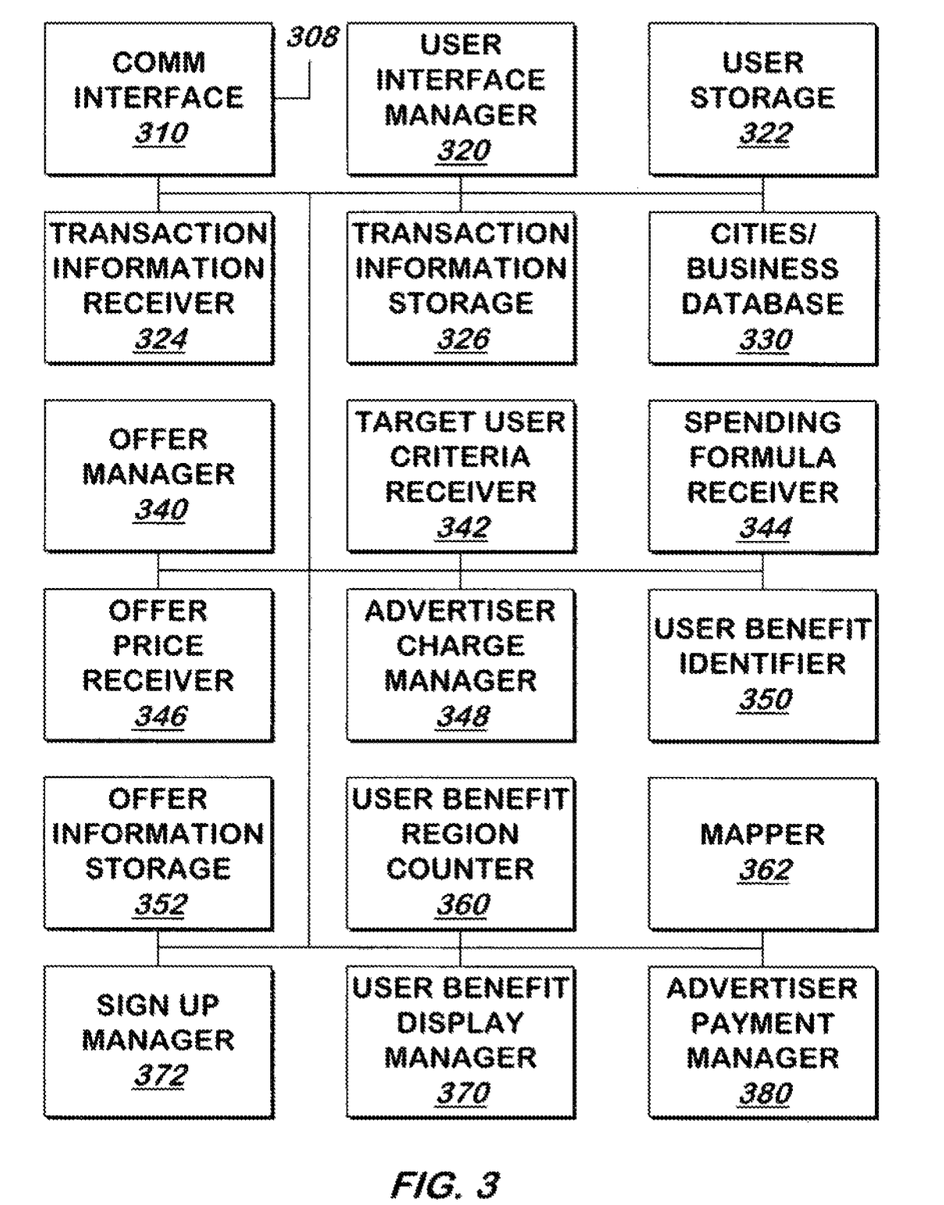
FIG. 3 is a block schematic diagram of a system for identifying users who can benefit from an offer and providing such offers to users according to one embodiment of the present invention.

FIG. 3 is a block schematic diagram of a system for identifying users who can benefit from an offer, and providing the offer to such users, according to one embodiment of the present invention. Referring now to FIG. 3, at any time, user interface manager 320 may receive a request to use the system from a user, for example via input/output 308 of communication interface 310. In one embodiment, communication interface 310 includes a conventional communication interface that supports TCP/IP or other conventional communication protocols, and input/output 308 of communication interface 310 is coupled to a network such as the Internet or a local area network or both. In one embodiment, all communication between the user and the system occurs via input/output 308 of communication interface 310, and also via a web browser or similar application hosted by the user's conventional computer system (not shown).

When user interface manager 320 receives the request, user interface manager 320 provides a user interface to the user for logging on to the system, or if the user is not yet registered, for providing registration information. In one embodiment, registration information includes a unique username and a password, either or both of which may be chosen by the user or assigned by user interface manager 320, and optionally one or more home locations, which may e.g. be a city and state in which the user lives or works, and/or the street addresses of locations where the user lives or works. In one embodiment, the registration information additionally includes one or more user attributes and other information described herein. As described herein and above, user attributes may for example include whether or not the user has children. User interface manager 320 stores the registration information in user storage 322, associated with a unique identifier for that user. In one embodiment, user storage 322 includes a conventional database, and the registration information is stored as part of a user record.

In one embodiment, user interface manager 320 also provides a user interface to the user, allowing the user to input transaction information. As described herein and above, in one embodiment, transaction information includes transaction records from credit card transactions, debit and check transactions, cash transactions, and other types of financially-related transactions. When the user provides the transaction information, user interface manager 320 provides the transaction information to transaction information receiver 324, and transaction information receiver 324 stores the transaction information in transaction information storage 326, associated with the user identifier for that user.

In one embodiment, transaction information receiver 324 may additionally or alternatively receive transaction information in real time or periodically, for example nightly, from the user's financial account or accounts. In this embodiment, the user may for example supply identifiers of such accounts as part of the registration information received by user interface manager 320 and stored in user storage 322 as described herein and above, and when the transaction information is received from the account, either automatically, or by transaction information receiver 324 requesting it from the financial institution via the identifiers registered as described above, transaction information receiver 324 finds the user identifier associated with that account in user storage 322, and stores the transaction information for that user in transaction information storage 326 associated with that user identifier. Some or all of the transaction information may be categorized by transaction information receiver 324 as described in the related application, though other means of categorizing transactions may be employed. Vendor names may also be identified for each transaction, by transaction information receiver 324.

As noted above, the matching of account numbers need not be performed to associate a user identifier with each piece of transaction data, as the user may supply an identifier and the transaction data or a location of the transaction data, in which case transaction information receiver 324 associates the user identifier with each piece of transaction data received in that manner from that user.

User interface manager 320 also provides the user identifier to user benefit identifier 350, which proceeds as described herein and below.

At any time, offer manager 340 may receive a request from an advertiser, for example via input/output 308 of communication interface 310, to create a new offer. In one embodiment, all communication between the advertiser and the system occurs via input/output 308 of communication interface 310, and also via a web browser or similar application hosted by the advertiser's conventional computer system (not shown). When offer manager 340 receives the request, offer manager 340 creates a new record for the offer, assigns the offer a unique offer identifier, and associates the offer record with an identifier of the advertiser, which offer manager 340 may for instance request and receive from the advertiser.

In one embodiment, offer manager 340 provides a user interface allowing the advertiser to provide an object corresponding to the offer as described above. Offer manager 340 receives the object and adds the information contained therein to the offer record or provides it to the components described below, which extract the pertinent information and add it to the offer record.

In another embodiment, the specification for each offer is received in parts, as will now be described. The parts may be parts of an object or they may be fields on a screen that the advertiser manually enters. In this embodiment, when offer manager 340 has created the offer record, offer manager 340 provides the offer record to target user criteria receiver 342, which provides a user interface to the advertiser, allowing the advertiser to provide target user criteria for the new offer. In one embodiment, as described herein and above, target user criteria describe the users to which an offer could apply, and may include home locations, user attributes, activity in a category or category descending from a specified category (e.g. one or more transactions in the "autos" category), transaction attributes (e.g. at least two transactions in the "auto rental" category that exceed $100 in the last two years), or lack of activity in a category or lack of a certain transaction or sufficient transactions (e.g. one) in one or more categories. The description may be in the form of a function of any of these items meeting or exceeding a threshold, or any other form. When the advertiser provides target user criteria, target user criteria receiver 342 adds that information to the offer record. Target user criteria receiver 342 provides the offer record to offer manager 340.

When offer manager 340 receives the offer record from target user criteria receiver 342, offer manager 340 provides the offer record to spending formula receiver 344, which provides a user interface to the advertiser, allowing the advertiser to provide a spending formula for the new offer. As described herein and above, the spending formula describes transactions or categories in which the user has purchased products or services that can be used to determine whether the advertiser's product or service could benefit that user. When the advertiser provides a spending formula, spending formula receiver 344 adds the spending formula to the offer record. Spending formula receiver 344 provides the offer record to offer manager 340.

When offer manager 340 receives the offer record from spending formula receiver 344, offer manager 340 provides the offer record to offer price receiver 346, which provides a user interface to the advertiser, allowing the advertiser to provide an offer price for the new offer. As described herein and above, in one embodiment the offer price includes all charges that might occur during a given period (e.g. one year) if the user purchases the advertiser's product or service, for example including any setup fee, any initial charges, and any later charges, plus taxes and other charges. In one embodiment, offer prices may vary by user attributes. For example, an advertiser may specify that the offer price should be lower for senior citizens than for younger users. When the advertiser provides the offer price, offer price receiver 346 adds the offer price to the offer record. When offer price receiver 346 has added the offer price, offer price receiver 346 provides the offer record to offer manager 340.

As noted, the offer price and spending formula may include one or more value component formulas that describe how to compute one or more value components as described above, and one or more bases of comparison to be used as described herein. Each basis may include a priority corresponding to that basis.

When offer manager 340 receives the offer record from offer price receiver 346, or when offer manager provides the information from the object to the offer record, offer manager 340 provides the offer record to user benefit identifier 350.

When user benefit identifier 350 receives the offer record, user benefit identifier 350 uses the spending formula, the user records in user storage 322, and the transaction information in transaction information storage 326 to identify users who would benefit from the offer. As described herein and above, in one embodiment, users that would benefit from the offer are those that match the target user criteria, and for which the outcome of the spending formula, as applied to that user's transaction information, is higher than the offer price for that user or higher by a threshold amount, optionally using any of the basis or bases that may be provided. For example, an advertiser may seek to offer a year of gym membership for the offer price of $400. The target user criteria for this offer may include users whose home locations include cities where the advertiser's gyms are located. For this offer, the spending formula may for example involve totaling all spending by such users in the "gym" category for the past year, and each user may be determined to benefit from the offer if that user's spending exceeds $400.

It is noted that the target criteria may include those users who receive products and services in a category from a specific competitor or competitors of the advertiser. A lower target user criteria threshold may be used for such users, and a lower price may be applied to such users.

When user benefit identifier 350 has identified any users who would benefit from the offer, user benefit identifier 350 provides the number of users determined to benefit from the offer (the number of users may be listed for each basis, with the numbers organized by the highest priority basis to which each user applies), even if that number is zero, to offer manager 340. In one embodiment, user benefit identifier 350 also provides the home locations associated with those users and, in the embodiment that offer price may vary by user attributes, the price of the offer for those users, to offer manager 340. User benefit identifier 350 may also determine and provide other information, such as the percentage of users determined to benefit from the offer as compared to the total number of users, or as compared to the total number of users matching the target user criteria. Offer manager 340 displays this information to the advertiser as described above.

In one embodiment, offer manager 340 additionally or alternatively displays a user interface to the advertiser, allowing the advertiser to request a display of the locations of users determined to benefit from the offer shown on a map. If the advertiser requests such a display, offer manager 340 provides the data it receives to mapper 362. In one embodiment, mapper 362 uses conventional GIS data and geocoding techniques or other similar techniques to generate a map on which the users' home locations are shown.

Additionally or alternatively, mapper 362 may generate a map showing the number of users in each state and/or metropolitan region that would benefit from the offer (or the number may be broken down by the number for each basis, which may be organized by the highest priority basis that applies to that user). In this embodiment, mapper 362 provides information it receives to user benefit region counter 360, and user benefit region counter 360 determines the region to which each home location corresponds. In one embodiment, the locations are identified as street addresses, and user benefit region counter 360 uses conventional GIS data and geocoding techniques to determine the latitude and longitude coordinates of each home location. In this embodiment, user benefit region counter 360 uses a list of the coordinate boundaries of regions, which may for example be received from a system administrator and internally stored by user benefit region counter 360, to determine the regions to which the home locations correspond. User benefit region counter 360 provides an indication of the number of users who would benefit from the offer whose home locations correspond to each region to mapper 362, and mapper 362 generates a map displaying this information, with the information corresponding to a region displayed on or near that region on the map. User region benefit counter 360 may also generate additional statistics, such as the average price that would be offered to users in each region, percentage of all of the users in the region who would benefit from the offer, and so on. Mapper 362 provides the map or maps to offer manager 340, and offer manager 340 displays the map or maps to the advertiser.

Offer manager 340 also computes and displays the offer fee to the advertiser. The offer fee is the amount that the advertiser will be charged for making the offer, and as described above, may include any or all of an up front price for making the offer, and a price charged for each offer that a user accepts. The offer fee may be computed based on the number of users, basis information, average spread between the offer price for a user and the outcome of the spending formula for that user, and/or other information. In one embodiment, the offer fee is a predetermined amount which may for example be received from a system administrator and internally stored by offer manager 340. In other embodiments, the offer fee may vary according to factors such as, for example, the number of users to which the offer will be made, as described herein and above. In this embodiment, offer manager 340 provides the offer record to advertiser charge manager 348, along with additional information required to compute the offer fee (such as the number of users determined to benefit from the offer), which in this embodiment is included in the information received from user benefit identifier 350, and advertiser charge manager 348 determines the offer fee for that offer. Advertiser charge manager 348 may use information stored in other locations in other embodiments to calculate the offer fee. Advertiser charge manager 348 adds the offer fee to the offer record and provides the offer record to offer manager 340, and offer manager 340 displays the offer fee to the advertiser.

The user interface provided by offer manager 340 also allows the advertiser to change the offer, or to make the offer. If the advertiser indicates that the offer should be changed, offer manager 340 provides a user interface allowing the advertiser to provide new target user criteria, a new spending formula, and/or a new offer price, which may be parts of an object as described herein. If the advertiser provides any or all of this information, the new target user criteria, new spending formula, and/or new offer price is received by offer manager 340, target user criteria receiver 342, spending formula receiver 344, and/or offer price receiver 346 and added to the offer record as described herein and above. Offer manager 340 then provides the offer record to user benefit identifier 350, and the process of determining users who would benefit from the offer and displaying the number of such users along with optional information such as the location of such users repeats, as described herein and above. In the embodiment that changing such information may also change the offer price, offer manager 340 and/or advertiser charge manager 348 also calculate and display a new offer fee as described herein and above. The advertiser can therefore experiment with the offer until the results are satisfactory to the advertiser.

When the advertiser indicates that the offer should be made, offer manager 340 provides a user interface to the advertiser, allowing the advertiser to provide sign up information and an offer message. As described herein and above, in one embodiment, sign up information includes a description of the information required from users who wish to sign up for the offer, an indication of where and how such sign up information should be transmitted and an offer message or messages (there may be one for each basis, for example, or different ones based on transaction information indicating the user is using a specific competitor, for example). The offer message, as described herein and above, may describe how to present the offer to the user, including the text of the offer that will be made, and may for example include XML or HTML. When the advertiser provides the sign up information and offer message, offer manager 340 adds the sign up information and offer message to the offer record and offer manager 340 provides (e.g. via a pointer) the offer record to sign up manager 372. Sign up manager 372 stores the offer record in offer information storage 352, and signals offer manager 340.

When so signaled, offer manager 340 provides advertiser charge manager 348 with the offer identifier, and advertiser charge manager 348 finds the offer record in offer information storage 352. Advertiser charge manager 348 charges the advertiser the offer fee indicated in the offer record. To charge the advertiser, advertiser charge manager 348 may for example request and receive billing information from the advertiser via a user interface provided by offer manager 340, and may send an electronic bill to an e-mail address specified in the billing information. In other embodiments, advertiser charge manager 348 may use other techniques to charge the advertiser, such as debiting an account supplied by the advertiser in the billing information. In one embodiment, advertiser charge manager 348 adds the billing information to the offer record so that the advertiser can be billed when users accept the offer, as described herein and below, such information being requested and received from the advertiser by advertiser charge manager 348.

The User Logs In

As described herein and above, when a user logs into the system via an interface provided by user interface manager 320, user interface manager 320 provides that user's user identifier supplied by the user upon logging in to user benefit identifier 350. When user benefit identifier 350 receives the user identifier, user benefit identifier 350 finds the user record corresponding to the user identifier that is stored in user storage 322, and also finds the transaction information for that user in transaction information storage 326 as described above. User benefit identifier 350 compares the transaction information to any offer records stored in offer information storage 352, in order to determine if there are any offers for which the user a) matches the target user criteria; b) would benefit from the offer (using any basis specified); and c) has not previously rejected or accepted the offer. In one embodiment, as described in more detail herein and below, the offer identifiers of rejected offers are stored in the user's record in user storage 322. If user benefit identifier 350 does not find any such offers that do not meet criteria a) b) and c) above, user benefit identifier 350 provides an indication to user interface manager 320 that no such offers were found, and in one embodiment user interface manager 320 takes no further action to present offers until the next time a user logs in. Other embodiments store the date the offer was rejected, and an offer may be repeated that meets criteria a) and b) above, if the date the offer was rejected exceeds a threshold amount of time from the current date.

If offers meeting the criteria are identified, user benefit identifier 350 provides the offer identifiers of any offers which the user has not already accepted or rejected, and for which the user matches the target user criteria, and from which the user is determined to benefit, to user interface manager 320. In one embodiment, user benefit identifier 350 also provides to user interface manager 320 the information used to determine that the user would benefit from the offer, such as the spending formula and calculation results, transaction information and calculation results, and any user attributes used to determine the offer price.

When user interface manager 320 receives the offer identifier(s) and any additional information, user interface manager 320 provides the first offer identifier to user benefit display manager 370. User benefit display manager 370 finds the corresponding offer record in offer information storage 352, and provides the offer message (or the one corresponding to the highest priority basis that applies to the user, or one based on any other criteria, which may have been specified as part of each message, which user benefit identifier 350 provides to user interface manager 320) included in the offer record to user interface manager 320.

When user interface manager 320 receives the offer message, user interface manager 320 displays that message to the user, and also provides a user interface for accepting, rejecting, or postponing the offer and/or all offers. The user interface may also display any additional information received from user benefit identifier 350, such as the spending formula and results, transaction information and results, and any user attributes used to determine the offer price, as described herein and above. The potential savings may also be displayed by user interface manager 320 as the difference between the spending formula results and the transaction information results.

User interface manager 320 may include a message indicating that the user will benefit from the offer, and may include some or all of the other information so as to explain why the user would benefit from the offer. The message may also explain the benefit, and the terms of the offer, as well as provide product or service information corresponding to the offer or links to obtain additional information.

If the user postpones the offer, and if there are more offer identifiers, user interface manager 320 provides the next offer identifier to user benefit display manager 370. As described herein and above, when user benefit display manager 370 receives the offer identifier, user benefit display manager 370 finds the corresponding offer record in offer information storage 352, and provides the appropriate offer message included in the offer record to user interface manager 320 as described above. User interface manager 320 displays that message to the user, and also provides a user interface for accepting, rejecting, or postponing the offer and/or all offers.

If there are no more offer identifiers, or if the user postpones all offers, in one embodiment user interface manager 320 takes no further action to display offers until the next time that user or another user logs in.

If the user rejects the offer, user interface manager 320 adds that offer identifier (and optionally the date and time) to that user's user record in user storage 322, and such offers are not displayed to the user again, or not displayed for a threshold amount of time as described herein and above. If there are more offer identifiers, user interface manager 320 provides the next offer identifier to user benefit display manager 370, and the process of presenting offer messages repeats for the next offer as described herein and above. In one embodiment, a count of the rejections is maintained by user interface manager in the user's user record for each offer, and after a threshold number of rejections, user interface manager will no longer display the offer to the user again. The threshold amount of time used to redisplay an offer may be a function of the number of times the user has rejected the offer.

If the user accepts the offer, user interface manager 320 provides the offer identifier and the user identifier to sign up manager 372. Sign up manager 372 locates the offer record in offer information storage 352, and compares the sign up information in the offer record to the user's user record stored in user storage 322. As described herein and above, in one embodiment, sign up information includes the information required from users who wish to sign up for the offer, and an indication of where and how such sign up information should be transmitted. If all the required sign up information is included in the user record, having been received from the user in a registration (or in signing up for other offers) user interface provided by user interface manager 320, sign up manager 372 signs the user up for the offer using the sign up information. If information required to sign the user up for the offer, for example payment information including a bank account or credit card, is not in the user record, sign up manager 372 requests and receives such information from the user via a user interface provided by user interface manager 320, and then signs the user up for the offer and optionally stores the information in the user's user record. Signing the user up for the offer may include encrypting and sending the sign up information for that user to the location indicated in the offer record corresponding to the identifier it receives. When sign up manager 372 has signed the user up for the offer, sign up manager 372 provides the offer identifier to user advertiser payment manager 380, and signals user interface manager 320.

When advertiser payment manager 380 receives the offer identifier, advertiser payment manager 380 finds the corresponding offer record in offer information storage 352, and checks the offer fee included in the offer record. If the offer fee includes a price charged for each offer that a user accepts, or a formula corresponding to user information, a number of users signed up for that offer or other information, advertiser payment manager 380 optionally computes the price and charges the advertiser that price, for example by using the billing information included in the offer record to add the charge to an invoice sent to the advertiser at the end of the month or charging an account. If bases are used to compute the price, the highest priority basis that applied to that user is provided to advertiser payment manager 380 by sign up manager 372, which receives it from user interface manager 320 if the user accepts the offer.

When signaled by sign up manager 372 as described herein and above, user interface manager 320 adds the offer identifier to a list of accepted offers in the user's user record in user storage 322. If there are more offer identifiers, user interface manager 320 provides the next offer identifier to user benefit display manager 370, and the process of presenting offer messages repeats for the next offer as described herein and above. Otherwise, in one embodiment, user interface manager 320 takes no further action to display offers until the next time that user or another user logs in.

The advertiser may be referred to herein as an "offeror".

What is claimed is:

1. A method for providing a graphical user interface to manage a campaign, comprising:

obtaining user information for a plurality of users, wherein the user information for a respective user of the plurality of users comprises at least:
  registration information;
  location information; and
  transaction information;
obtaining offer information related to an offer from an advertiser, wherein the offer information comprises at least:
  an offer category;
  a target user criterion;
  a spending formula; and
  an offer price;
identifying a set of users from the plurality of users that would benefit from the offer from the advertiser, wherein:
  each user of the set of users matches the target user criterion;
  each user of the set of users has at least one transaction record in the offer category; and
  an outcome of the spending formula for each user of the set of users as applied to that user's transaction information is higher than the offer price;
displaying on a display of an electronic device:
  a number of the set of users in each region of a plurality of regions according to the location information of each user in the set of users;
  an offer fee, wherein the offer fee is based on:
    the number of the set of users in each region of the plurality of regions; and
    an average spread between the offer price for each respective user in the set of users and the outcome of the spending formula for that respective user; and
  an input element configured to allow the advertiser to modify at least one of:
    the target user criterion;
    the spending formula; or
    the offer price; and
upon receiving a modification via the input element, displaying on the display of the electronic device:
  a new offer fee; and
  a new number of a set of users that would benefit from the offer.

2. The method of claim 1, further comprising:
receiving an authorization of the offer from the advertiser; and
receiving an offer message via one of an HTML or an XML file from the advertiser, wherein the offer message comprises:
  a description of how to present the offer to the user;
  a first text description based on a first basis of comparison; and
  a second text description based on a second basis for comparison.

3. The method of claim 1, further comprising:
displaying on the display of the electronic device: a percentage of users that would benefit from the offer, wherein the percentage is a number of the set of users that would benefit from the offer divided by the number of the set of users meeting the target criterion.

4. The method of claim 1, further comprising: displaying on the display of the electronic device, the number of the set of users that would benefit from the offer and that currently use another vendor other than the advertiser.

5. The method of claim 1, further comprising: displaying on the display of the electronic device, for each respective region of a plurality of regions on a map, an average of the offer fee that would be paid in the respective region on the map.

6. The method of claim 1, wherein the registration information comprises user account information at a financial institution.

7. The method of claim 1, wherein the target user criterion comprises one of:
  a location;
  a user attribute;
  a transaction activity in a category;
  a transaction attribute;
  a lack of transaction activity in a category; or
  a lack of a certain transaction in a category.

8. A non-transitory computer-readable storage medium storing program instructions for performing a method for providing a graphical user interface to manage a campaign, the method comprising:
obtaining user information for a plurality of users, wherein the user information for a respective user of the plurality of users comprises at least:
  registration information;
  location information; and
  transaction information;
obtaining offer information related to an offer from an advertiser, wherein the offer information comprises at least:
  an offer category;
  a target user criterion;
  a spending formula; and
  an offer price;
identifying a set of users from the plurality of users that would benefit from the offer from the advertiser, wherein:
  each user of the set of users matches the target user criterion;
  each user of the set of users has at least one transaction record in the offer category; and
  an outcome of the spending formula for each user of the set of users as applied to that user's transaction information is higher than the offer price;
displaying on a display of an electronic device:
  a number of the set of users in each region of a plurality of regions according to the location information of each user in the set of users;
  an offer fee, wherein the offer fee is based on:
    the number of the set of users in each region of the plurality of regions; and
    an average spread between the offer price for each respective user in the set of users and the outcome of the spending formula for that respective user; and
  an input element configured to allow the advertiser to modify at least one of:
    the target user criterion;
    the spending formula; or
    the offer price; and
upon receiving a modification via the input element, displaying on the display of the electronic device:
  a new offer fee; and
  a new number of a set of users that would benefit from the offer.

9. The non-transitory computer-readable storage medium of claim 8, wherein the method further comprises:
receiving an authorization of the offer from the advertiser; and receiving an offer message via one of an HTML or an XML file from the advertiser, wherein the offer message comprises:
a description of how to present the offer to the user;
a first text description based on a first basis of comparison; and
a second text description based on a second basis for comparison.

10. The non-transitory computer-readable storage medium of claim 8, wherein the method further comprises: displaying on the display of the electronic device: a percentage of users that would benefit from the offer, wherein the percentage is a number of the set of users that would benefit from the offer divided by the number of the set of users meeting the target criterion.

11. The non-transitory computer-readable storage medium of claim 8, wherein the method further comprises: displaying on the display of the electronic device, the number of the set of users that would benefit from the offer and that currently use another vendor other than the advertiser.

12. The non-transitory computer-readable storage medium of claim 8, wherein the method further comprises: displaying on the display of the electronic device, for each respective region of a plurality of regions on a map, an average of the offer fee that would be paid in the respective region on the map.

13. The non-transitory computer-readable storage medium of claim 8, wherein the registration information comprises user account information at a financial institution.

14. The non-transitory computer-readable storage medium of claim 8, wherein the target user criterion comprises one of:
a location;
a user attribute;
a transaction activity in a category;
a transaction attribute;
a lack of transaction activity in a category; or
a lack of a certain transaction in a category.

15. An apparatus for providing a graphical user interface to manage a campaign, comprising:
a memory;
a display; and
a processor configured to:
obtain user information for a plurality of users, wherein the user information for a respective user of the plurality of users comprises at least:
registration information;
location information; and
transaction information;
obtain offer information related to an offer from an advertiser, wherein the offer information comprises at least:
an offer category;
a target user criterion;
a spending formula; and
an offer price;
identify a set of users from the plurality of users that would benefit from the offer from the advertiser, wherein:
each user of the set of users matches the target user criterion;
each user of the set of users has at least one transaction record in the offer category; and
an outcome of the spending formula for each user of the set of users as applied to that user's transaction information is higher than the offer price;
display on the display of an electronic device:
a number of the set of users in each region of a plurality of regions according to the location information of each user in the set of users;
an offer fee, wherein the offer fee is based on:
the number of the set of users in each region of the plurality of regions; and
an average spread between the offer price for each respective user in the set of users and the outcome of the spending formula for that respective user; and
an input element configured to allow the advertiser to modify at least one of:
the target user criterion;
the spending formula; or
the offer price; and
upon receiving a modification via the input element, display on the display of the electronic device:
a new offer fee; and
a new number of a set of users that would benefit from the offer.

16. The apparatus of claim 15, wherein the processor is further configured to:
receive an authorization of the offer from the advertiser; and
receive an offer message via one of an HTML or an XML file from the advertiser, wherein the offer message comprises:
a description of how to present the offer to the user;
a first text description based on a first basis of comparison; and
a second text description based on a second basis for comparison.

17. The apparatus of claim 15, wherein the processor is further configured to:
display on the display of the electronic device: a percentage of users that would benefit from the offer, wherein the percentage is a number of the set of users that would benefit from the offer divided by the number of the set of users meeting the target criterion.

18. The apparatus of claim 15, wherein the processor is further configured to: display on the display of the electronic device, the number of the set of users that would benefit from the offer and that currently use another vendor other than the advertiser.

19. The apparatus of claim 15, wherein the processor is further configured to: display on the display of the electronic device, for each respective region of a plurality of regions on a map, an average of the offer fee that would be paid in the respective region on the map.

20. The apparatus of claim 15, wherein the target user criterion comprises one of:
a location;
a user attribute;
a transaction activity in a category;
a transaction attribute;
a lack of transaction activity in a category; or
a lack of a certain transaction in a category.

\* \* \* \* \*